United States Patent [19]
Lee

[11] Patent Number: 5,498,020
[45] Date of Patent: Mar. 12, 1996

[54] VEHICLE SUSPENSION SYSTEM FOR A STEERABLE DRIVE WHEEL

[75] Inventor: Unkoo Lee, Kyungki, Rep. of Korea

[73] Assignee: Hyundai Motor Company, Seoul, Rep. of Korea

[21] Appl. No.: 478,540

[22] Filed: Jun. 7, 1995

Related U.S. Application Data

[62] Division of Ser. No. 174,017, Dec. 28, 1993.

[30] Foreign Application Priority Data

Dec. 30, 1992 [KR] Rep. of Korea .................. 92-26741
Dec. 30, 1992 [KR] Rep. of Korea .................. 92-26742

[51] Int. Cl.$^6$ ........................................ B60G 3/00
[52] U.S. Cl. ................................. 280/675; 280/692
[58] Field of Search ................... 280/660, 673, 280/691, 675, 692, 696

[56] References Cited

U.S. PATENT DOCUMENTS 3,161,419 12/1964 Schaaf .................. 280/691 X
4,685,690 8/1987 Fujita et al. .................. 280/692 X
5,257,801 11/1993 Matsuzawa et al. .................. 280/675 X
5,284,353 2/1994 Shinji et al. .................. 280/691 X

*Primary Examiner*—Robert J. Oberleitner
*Assistant Examiner*—Lee W. Young
*Attorney, Agent, or Firm*—Birch, Stewart, Kolasch & Birch

[57] ABSTRACT

A vehicle suspension system for a steerable wheel directed to such objects as to improve handling safety by reducing the height of a roll center and the variation ratio of the height of a roll center with imaginary links, to enhance free layout degree by applying multi-links and setting up the changement of kingpin, camber, and tread independently in accordance with the arrangement of links, and to ensure a maximum effective volume of an engine room by minimizing a space occupied by a suspension system, wherein a plurality of links are disposed so that an intersecting point of an imaginary line connecting a pivot joint where a connecting arm is connected to a wheel carrier to an instantaneous center of the connecting arm with respect to a vehicle body with an imaginary line connecting a pivot joint to a hinge point of a lower control arm becomes an instantaneous center of the wheel with respect to the vehicle body.

8 Claims, 5 Drawing Sheets

VEHICLE SUSPENSION SYSTEM FOR A STEERABLE DRIVE WHEEL

This application is a division of copending application Ser. No. 08/174,017, filed on Dec. 28, 1993, the entire contents of which are hereby incorporated by reference.

BACKGROUND OF THE INVENTION

1. Field of the Invention

The present invention relates to a vehicle suspension system for a steerable wheel. More particularly, it relates to a vehicle suspension system for a steerable wheel which makes it easy to provide an imaginary kingpin axis, improves handling safety by setting up imaginary links and minimizes the variation ratio of the height of a roll center to enhance a free layout degree with respect to the change in camber and tread, and especially ensures maximum effective volume in an engine room by minimizing the space occupied by a suspension system.

2. Description of Related Art

In general, a vehicle suspension system for a steerable wheel connects an axle and a vehicle body to each other, and absorbs vibrations and impacts from a road surface during the vehicle's running, such that safety of the vehicle can be obtained, and ride comfort is improved.

To absorb impacts, a vehicle suspension system should be connected flexibly in a vertical direction, and to endure driving force, braking force and centrifugal force generated at a wheel during the vehicle's turning, a vehicle suspension should be connected firmly in a horizontal direction.

The vehicle suspension system is classified structurally as a suspension system integrated with an axle and an independent suspension system. While a suspension system integrated with an axle is applied to a large vehicle like buses, trucks, and rear axles of passenger cars, an independent suspension system is applied mainly to an axle of a passenger car. To improve ride comfort and running safety, an independent suspension is bisected to act independently.

Among these suspension systems, the present invention relates to an independent suspension system.

There are many kinds of suspension systems in independent suspension systems. As a suspension system applied to a steerable wheel, Macpherson type and Wishbone type are widely applied.

A vehicle suspension system for a steerable wheel is designed to control a position of a wheel with respect to the vehicle body to obtain a better positioning in a vehicle operation as well as absorb vibrations or impacts. The axle is thereby prevented from directly transmitting impact or vibration from a road surface to the vehicle body, so that optimal handling safety and running safety can be obtained.

The front wheel is mounted to be changeable in its direction from right to left or from left to right, centering the kingpin, and is also mounted with a geometrical angle to meet the requisite for the front suspension.

Mounting the front wheel with the geometry angle is called wheel alignment. The wheel alignment is determined by several elements, but the optimal operation of the front wheel is, however, achieved by the supplemental operation of the elements With respect to each other.

A kingpin inclination among the elements reduces handling force of a steering wheel with a camber, absorbs any impact generated from the vehicle motion and then increases restitution force of the steering wheel. The turning safety of the straight ahead position of the vehicle and the handling safety in the vehicle's turning position are thereby obtained.

The kingpin inclination is such that the kingpin is mounted with its central line lying at a predetermined angle with respect to the vertical line when the vehicle is viewed from the front.

An interval between the central line of the kingpin and a central line of the wheel is called offset. The offset is generally characterized as an offset at the wheel center and an offset at the ground.

The offset at the wheel center has an effect on the straight ahead characteristics of the vehicle when driving force and an engine brake are applied to the wheel.

The offset at the ground has an effect on the handling safety when the vehicle brakes and turns. If the offset at the ground is decreased, the sensitivity with respect to the steering is decreased, in the same manner as the handling safety is increased when the vehicle brakes and turns.

Vibrations have something to do with the vehicle safety, since rolling, pitching, yawing as well as bounce occur during the vehicle's driving. Only if these vibrations are absorbed softly, will ride comfort and safety be improved.

As the vibration of a vehicle is concerned, vibration generated when a vehicle is turning is defined as rolling, which means that a vehicle vibrates in the left-and-right directions, and rolling has an important effect upon turning safety.

The certain basic point where rolling occurs is called a roll center (RC). Rolling occurs because the centroid of a vehicle is higher than a roll center. Accordingly, the greater the change in a height of a roll center, the greater the gravity of a vehicle moves. Therefore, this phenomenon results in a greater slip angle, so the running safety and the handling safety get worse.

To ensure running safety, the variation ratio of the height of RC is desired to be maintained.

Considering the above, the prior suspension system is described in detail hereinafter.

FIG. 5A illustrates a general Macpherson type suspension system, which comprises a strut arm 113 formed integrally to a steering knuckle 111, provided elastically with a spring 114 at the upper end and a shock absorber 112, and a lower arm 115 attached to the steering knuckle 111 by a ball joint 116 and to the vehicle body by a hinge at the other end of the lower arm.

This suspension system has some advantages of simple structure including a small spring, light mass, and a small effective volume of an engine room. But in order to make the kingpin offset (a) little or minus, the upper supporting point 117 of the strut arm 113 is to be moved toward the engine room, or the lower end of the strut arm 113 connected to the ball joint 116 is displaced outside.

However, if the upper supporting point 117 of the strut arm 113 is displaced toward the engine room, the effective volume of an engine room is reduced and the kingpin angle (α) becomes excessively large only to have a bad effect on cornering ability of a vehicle.

If the lower end of the strut arm 113 in alignment with the ball joint 116 is displaced outside, it is actually impossible to reduce the kingpin offset (α) because it will interfere with a brake disk attached to a wheel.

FIG. 5B illustrates a general Wishbone type suspension system including upper and lower control arms 121, 122, a steering knuckle 123, a spring assembly 125 including a shock absorber 124 and ball joints 126, 127 connecting the upper and lower control arms 121, 122 to the steering knuckle 123.

In order to adjust the kingpin offset (α), the vehicle body side connection portion 128 of the upper control arm 121 should be displaced toward the engine room, or the ball joint 127 of the lower control arm 122 should be displaced outside.

But, in a Wishbone type suspension system, as well as Macpherson type suspension system, if the vehicle body side connecting portion 128 of the upper control arm 121 is displaced toward the engine room, the effective volume of an engine room is reduced and the kingpin angle (α) becomes excessively large to adversely affect turning ability of a vehicle, and if the ball joint 127 of the lower control arm 122 is displaced outside, it is actually impossible to reduce the kingpin offset because it will interfere with a brake disk attached to the wheel.

SUMMARY OF THE INVENTION

As noted above, the conventional Macpherson type suspension and Wishbone type suspension have a limitation to improve the function of suspension systems, because a free layout degree to provide a kingpin angle is limited to such a tiny bound that it is impossible to reduce the size of a kingpin offset. Besides, the vertical motion of a wheel is actuated by short control arms in any type, so the great change in the height of a roll center makes running safety worse.

To solve such problems of the conventional technology, the present invention is provided. A primary object of the invention is to improve handling safety by making it easy to provide an imaginary kingpin axis and minimizing the variation ratio of the height of a roll center with an imaginary link.

Another object of the present invention is to enhance the free layout degree by making it possible to set up the kingpin axis independently from the change in the angle of camber and tread.

A further object of the invention is to ensure a maximum effective volume of an engine room by minimizing the space occupied by a suspension system.

To accomplish the above objects, the present invention provides a vehicle suspension system for a steerable wheel comprising a wheel carrier rotatably supporting a wheel, and having a projection portion at a rear part connected with a known tie rod by a ball joint, and so can be steered by a tie rod, a connecting arm having a wheel side end thereof pivotally connected to an upper part of the wheel carrier, an upper control arm having both vehicle body side end connection parts diverged into a front branch and a rear branch, and connecting the wheel carrier to the vehicle body, a lower control arm having both vehicle body side end connection parts diverged into a front branch and a rear branch, and connecting the lower part of the wheel carrier to the vehicle body, a connecting link having both side ends connected to a middle point of a connecting arm and the lower control arm respectively, and a strut assembly including a shock absorber and a spring, having the upper part connected to the vehicle body by an insulated connection part and the lower part pivotally connected to the neighboring part of the lower connecting part of the connecting link.

The present invention provides a vehicle suspension system wherein many links are disposed so that an intersecting point of an imaginary line connecting the pivot joint of the connecting arm to the wheel carrier and an instantaneous center of the connecting arm with respect to the connecting link, with an imaginary line connecting the pivot joint and hinge point of the lower control arm may become an instantaneous center of the wheel with respect to the vehicle body.

Also the present invention provides a vehicle suspension system comprising a wheel carrier rotatably supporting a wheel and having a projection portion at a rear part connected with a known tie rod by a ball joint, and so can be steered by the tie rod, a connecting arm having the wheel side end connection part connected to the upper end of the wheel carrier, an upper control arm having both vehicle body side connection parts diverged into a front branch and a rear branch, a link carrier having a wheel side end connected to the upper part of the wheel carrier, a lower control arm including a pair of an upper arm and a lower arm and connecting the link carrier to the vehicle body, a connecting link for pivotally connecting the middle point of the connecting arm and the link carrier, a strut assembly including a shock absorber and a spring and having the upper end supported to the vehicle body by an insulated connection part and the lower end connected to the link carrier neighboring to the lower end connection part of the connecting arm, and a longitudinal member including a pair of arms, disposed longitudinally with respect to the vehicle body and connecting the link carrier to the vehicle body.

Furthermore, the present invention provides a suspension wherein in a multi-link type suspension system, many of the links are disposed so that an intersecting point of an imaginary line connecting a pivot joint of the connecting arm to be connected to the wheel carrier to an instantaneous center of the connecting arm with respect to the vehicle with an imaginary line connecting a pivot joint of the link carrier to be connected to the wheel carrier to an instantaneous center of the lower control arm may become an instantaneous center of the wheel with respect to the vehicle body.

DETAILED DESCRIPTION OF THE PREFERRED EMBODIMENTS

Figure 1:
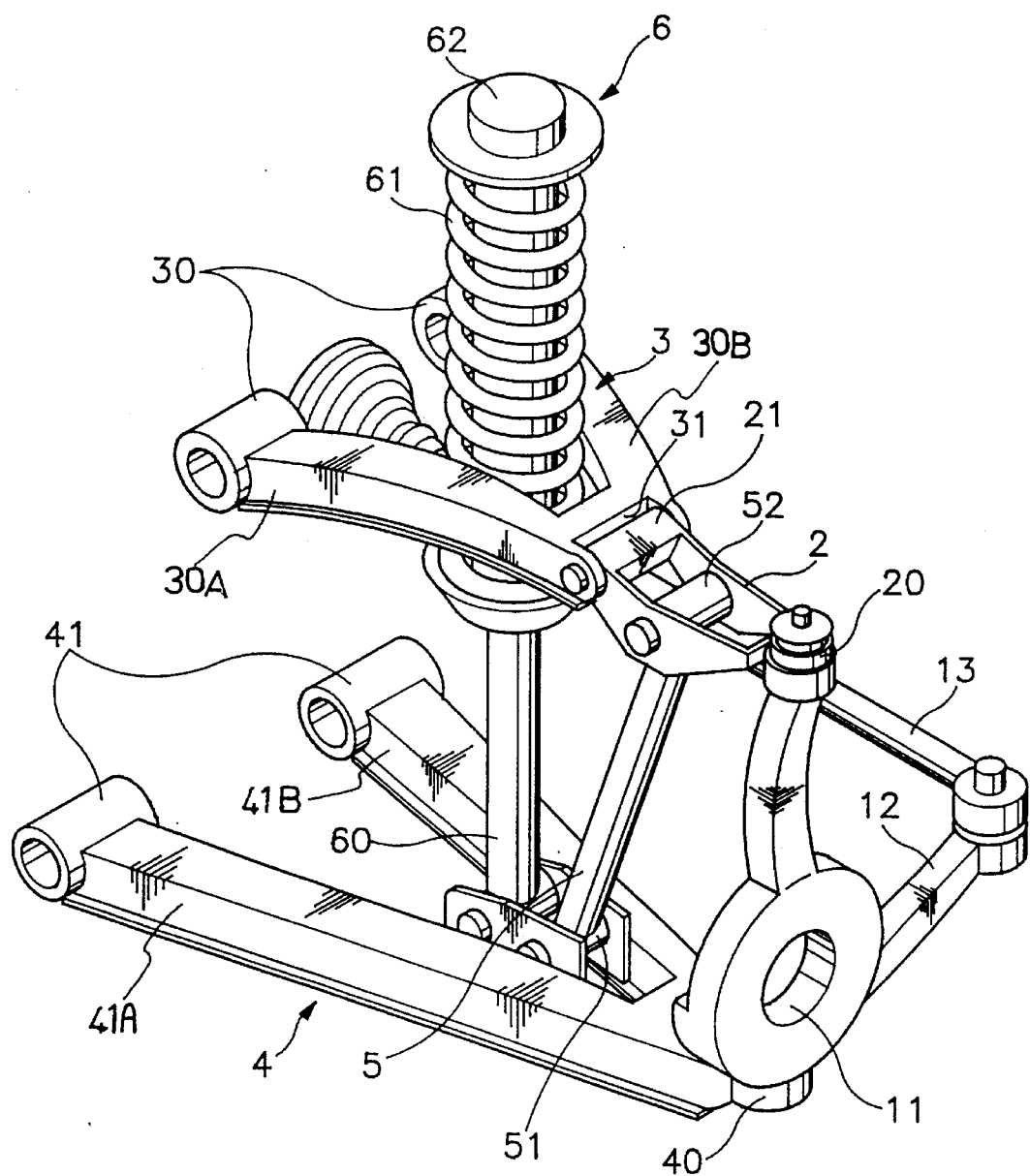
FIG. 1 is a perspective view of a suspension system in accordance with a first embodiment of the present invention.

FIG. 1 is a perspective view of a suspension of a first preferred embodiment.

A wheel carrier 1 supports a wheel 10 rotatably and in case of steerable drive wheel has a penetrated hole 11 to insert a drive shaft provided with a spindle (not shown) to drive the wheel 10.

At the rear part of the wheel carrier 1 is formed a projection part 12 connected with a known tie rod 13 by a ball joint to steer the wheel carrier 1.

If the wheel is not a steerable wheel, the projection part 12 and the tie rod 13 may be omitted.

The connecting arm 2 whose wheel side end connection part 20 is connected to the upper end of the wheel carrier 1 by a ball joint is inserted between the wheel carrier 1 and the upper control arm 3, and the vehicle side end connection part 21 of the connecting arm 2 is connected to a wheel side connection part 31 of the upper control arm 3 by an elastic bush or a pin joint.

The vehicle side end of the upper control arm 3 connecting the vehicle side end of the connecting arm 2 to the vehicle is diverged into a front branch 30A and a rear branch 30B, and has both of the vehicle body side connection parts 30 connected pivotally to the vehicle body by inserting an elastic bush. The wheel side connecting part 31 is pivotally connected to the vehicle body side end of the connecting arm by inserting an elastic bush.

The vehicle side end of the lower control arm 40 connecting the lower end of the wheel carrier 1 to the vehicle body is diverged into a front branch 41A and a rear branch 41B, and has both of the vehicle body side connection parts 41 pivotally connected to the vehicle body by inserting an elastic bush. The wheel side connecting part 40 is connected to the wheel carrier 1 by a ball joint.

In both side ends of a connecting link 5 inserted between the connecting arm 2 and a lower control arm 4, there are formed connection parts 51, 52 where the middle part of the connecting arm 2 and the lower control arm 4 are connected. And the lower end of the connecting link 5 is a little slanted toward wheel side and connected by an elastic bush or a pin joint.

The elastic bushes, pin joints and ball joints reciprocally connecting the control arms 3, 4, the connecting arm 2 and the connecting link 5 are made of the same materials as those used in conventional suspensions, and enables the wheel 10 including the wheel carrier 1 to move up and down with respect to the vehicle body 11.

The elastic bushes used in the connection parts have proper elasticity and properly control up-and-down vibrations of the control arms 3, 4.

As a shock absorbing member, a strut assembly 6 has a shock absorber 60 and a spring 61, and it is supported to the vehicle body by an insulated connection part 62. The lower end of the strut assembly 6 is pivotally connected to lower control arm 4 adjacent to the lower connection part 51 of the connecting link 5 to absorb the up-and-down impact of the vehicle body.

Figure 2:
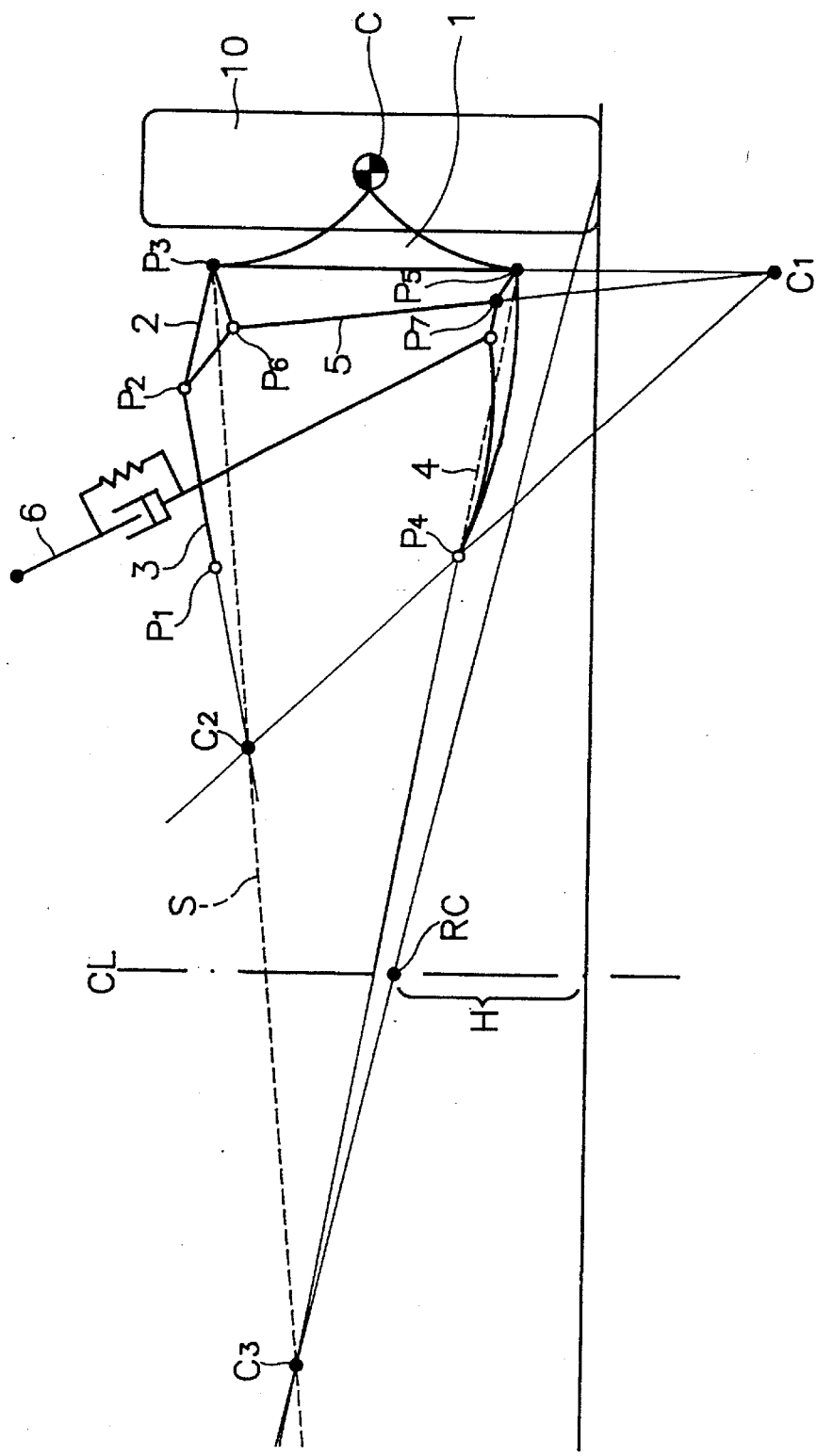
FIG. 2 is a schematic diagram for illustrating an effect of the present invention.

Referring to FIG. 2, the operating effect is illustrated hereinbelow, and the affixed marks $P_{1,2,3,4,5,6,7}$ stand for the connection parts, and only the main marks of the arms and links are affixed.

When it comes to instantaneous centers of every component of a suspension system while the wheels are vibrating up and down or rolling, instantaneous centers of the upper and the lower control arms 3, 4 with respect to the vehicle body are $P_1$, $P_4$ where the arms are connected to the vehicle body, instantaneous centers of the connecting arm 2 with respect to the upper control arm 3 is $P_2$ where the upper control arm 3 is connected to the connecting arm 2, and instantaneous centers of the wheel 10 with respect to the upper and the lower control arms 3, 4 are the connection points $P_3$, $P_5$.

An intersecting point ($C_1$) of an extended line connecting $P_3$, $P_5$ and an extended line connecting $P_6$, $P_7$ becomes an instantaneous center of the connecting arm 2 with respect to the wheel carrier 1 and the connecting link 5, and an intersecting point ($C_2$) of an extended line connecting $C_1$, $P_4$ and an extending line connecting $P_2$, $P_1$.

Accordingly, an intersecting point ($C_3$) of an extended line connecting $C_2$, $P_3$ where the connecting arm 2 is connected to the wheel carrier 1, and an extending line connecting $P_5$, $P_4$ connection points of the lower control arm 4 becomes an instantaneous center of the wheel.

So, an imaginary swing arm (S) of the segment line $P_3$, $C_3$ becomes an imaginary upper control arm.

The length of the imaginary upper control arm, the segment line $P_3$, $C_3$, is so long that a rotating angle of the segment line $P_3$, $C_3$ with respect to the vertical displacement of the instantaneous center ($C_3$) is very tiny.

As a result, the height variation of the instantaneous center ($C_3$) gets small relatively, and it means that the variation of the height (H) of a roll center (RC) that is an intersecting point of a connecting line of the instantaneous center ($C_3$) and a tread with the center line (CL) of the vehicle body gets small.

The small height variation of the roll center (RC) relatively improves the handling safety and results in enhanced running safety.

Figure 3:
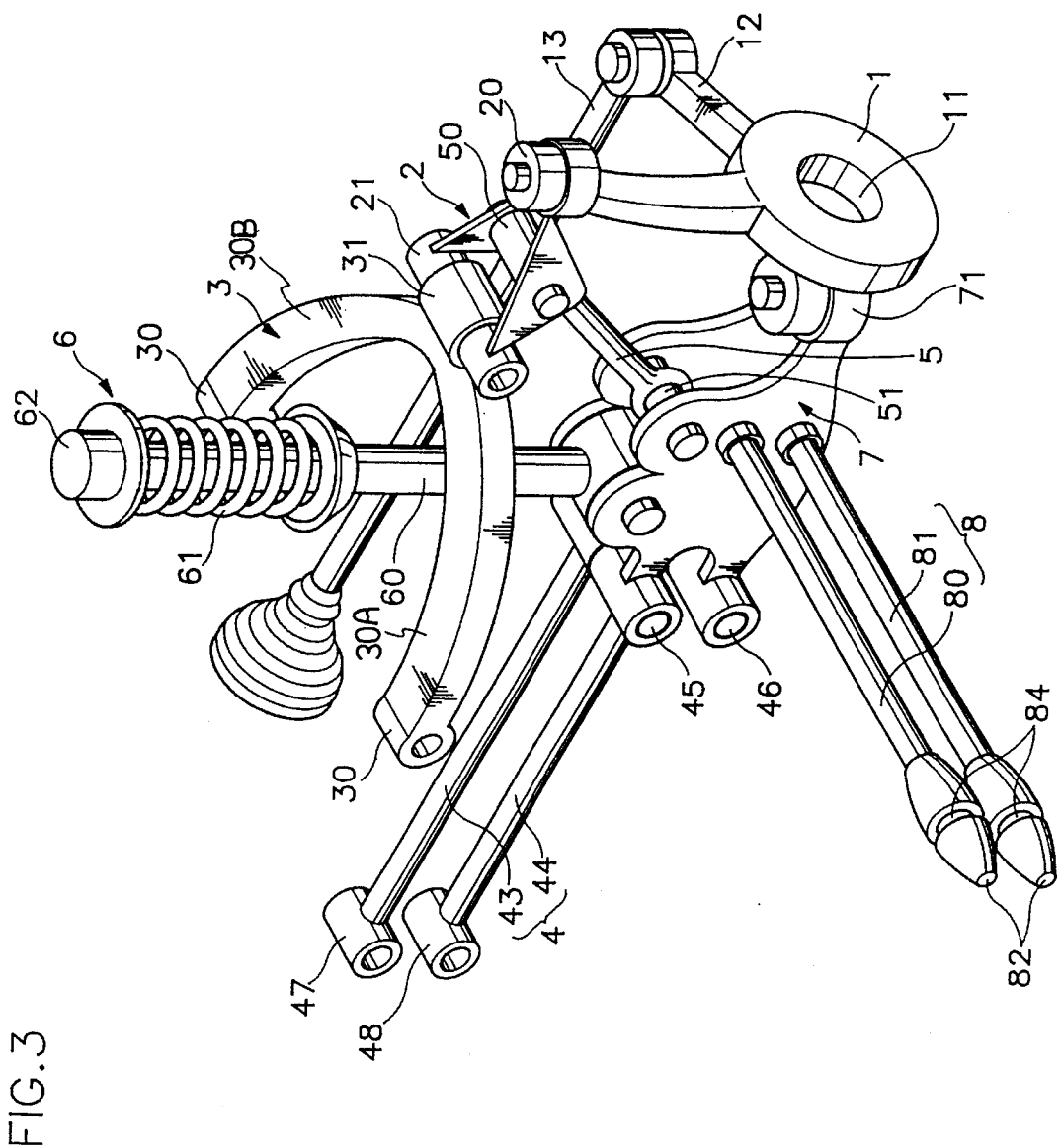
FIG. 3 is a perspective view of a suspension system of a second embodiment of this invention.
Figure 4:
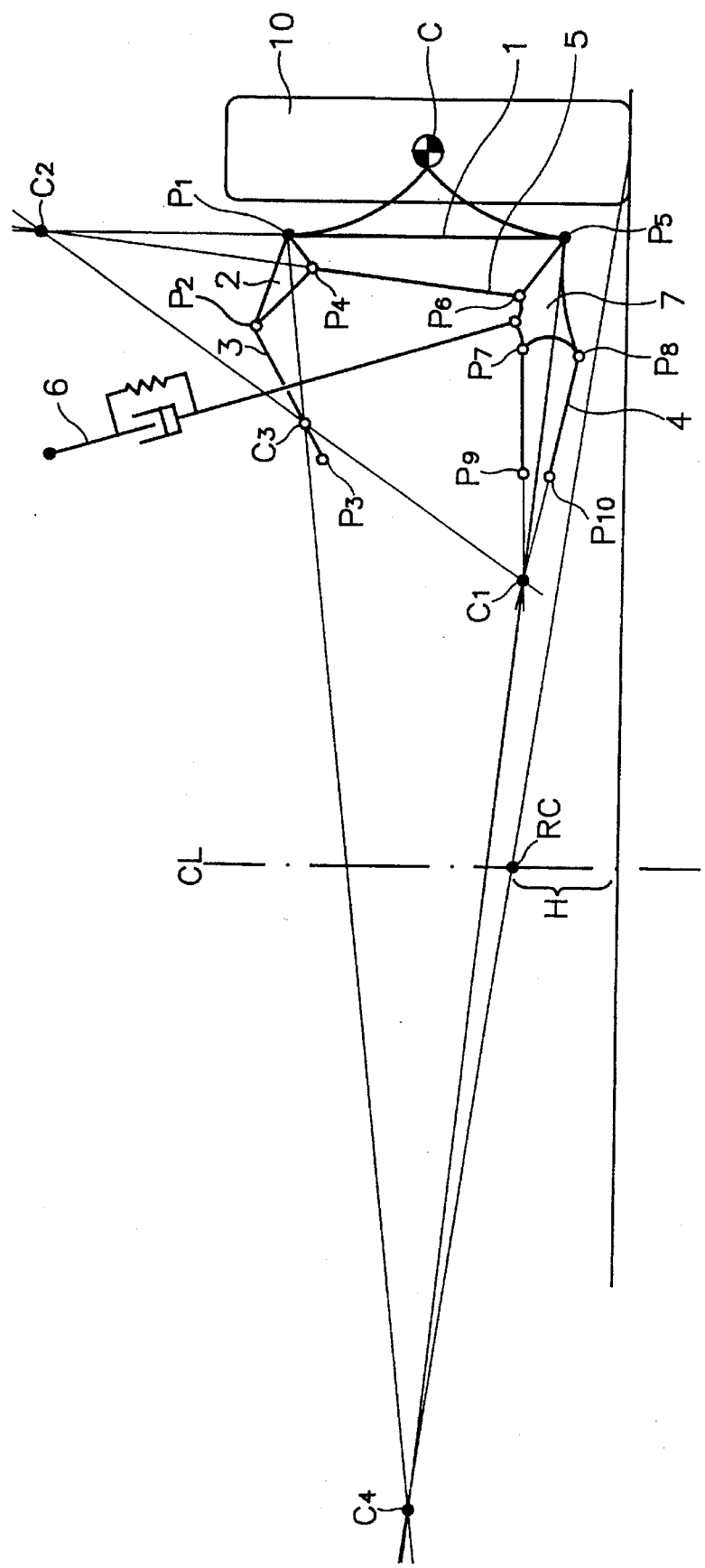
FIG. 4 is a schematic diagram for illustrating an effect of the second embodiment of this invention.
Figure 5B:
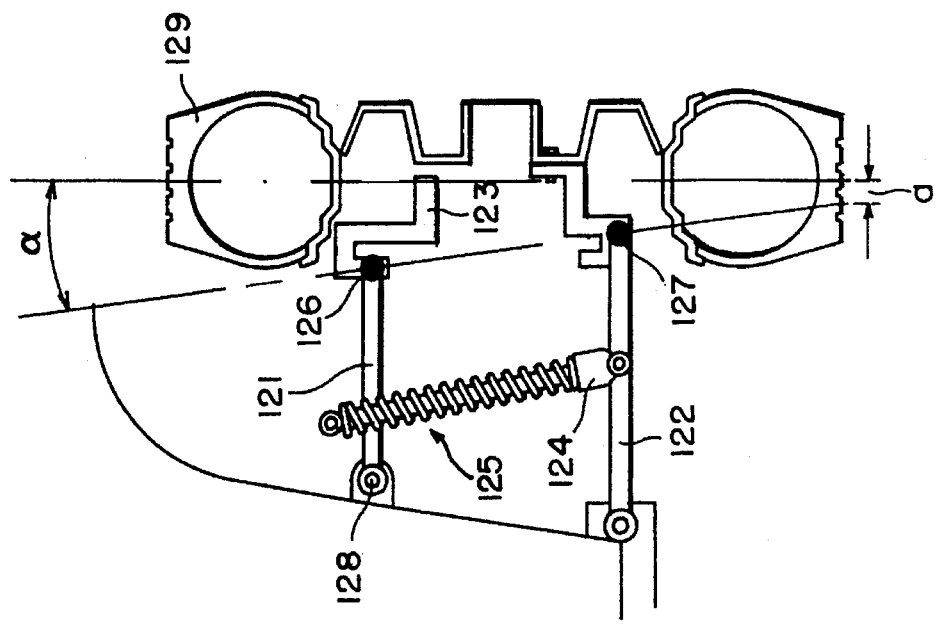
FIGS. 5A and 5B show conventional structures of a suspension system.
Figure 5A:
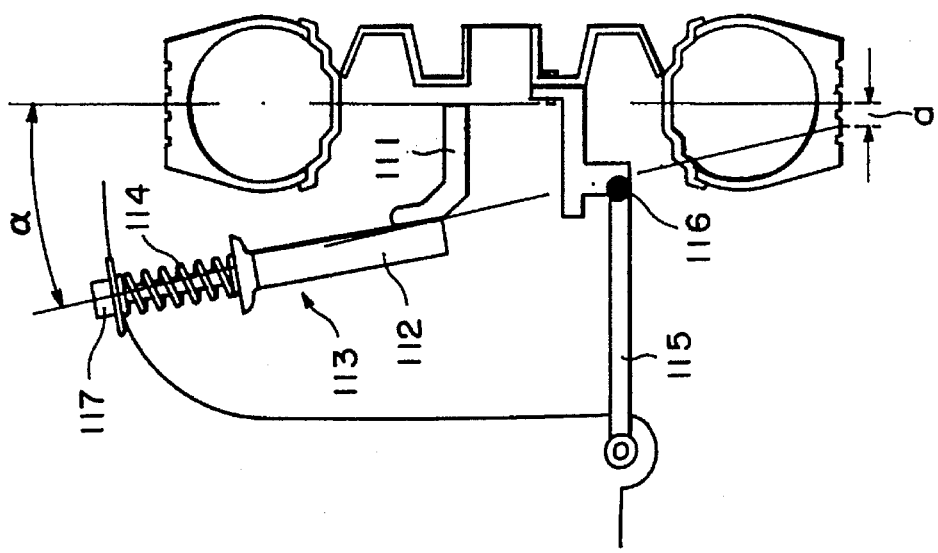

FIG. 3 and FIG. 4 relate to a suspension of another embodiment of the present invention, and the same marks are affixed to the same components.

FIG. 3 is a perspective view of a suspension of another embodiment of the present invention. A wheel carrier 1 is rotatably supporting a wheel 10. In the case of a steerable drive wheel, a penetrated hole 11 is formed at the center of the wheel carrier 1, and a drive shaft is inserted through the penetrated hole and drives the wheel 10 with a spindle formed at the front end (not shown).

At the rear part of the wheel carrier 1 is formed a projection part 12 connected with a known tie rod 13 by a ball joint to steer the wheel carrier 1.

If the wheel is not a steerable wheel, the projection part 12 and the tie rod 13 are omitted.

The connecting arm 2 whose wheel side end connection part 20 is connected to the upper end of the wheel carrier 1 by a ball joint is inserted between the wheel carrier 1 and the upper control arm 3, and the vehicle side end connection part 21 of the connecting arm 2 is connected to the wheel side connection part 31 of the upper control arm 3 by an elastic bush or a pin joint.

The vehicle side end of the upper control arm 2 connecting the vehicle side end of the connecting arm 2 to the vehicle is diverged into a front branch 30A and a rear branch 30B, and has both of the vehicle body side connection parts 30 to connect pivotally to the vehicle body, upon inserting an elastic bush. The wheel side connection part 31 is pivotally connected to the vehicle body side end of the connecting arm 2, by inserting an elastic bush.

The wheel side end of a link carrier 7 is connected to the lower end of the wheel carrier 1 by a ball joint, and to the upper and lower ends of the vehicle body side of the link carrier 7 are connected the wheel side ends of a pair of lower control arms 4 including a front arm 43 and a lower arm 44 with an elastic bush inserted. The vehicle body side connection points 47, 48 of the lower control arm 4 are connected to the vehicle body with an elastic bush inserted.

In both side ends of the connecting link 5 inserted between the connecting arm 2 and the link carrier 7 are formed connection points 50, 51. The connection points 50, 51 are connected to the middle point of the connecting arm 2, slanted a little toward the wheel side of the link carrier 7 by an elastic bush or a pin joint.

As a shock absorbing member, the strut assembly 6 has a shock absorber 60 and a spring 61, and it is supported to the vehicle body by the insulated connection part 62. The lower end of the strut assembly 6 is pivotally connected to the link carrier 7 adjacent to the lower connecting point 51 of the connecting link 5 to absorb the up-and-down impacts of the vehicle body.

At the front surface of the link carrier 7 are disposed a pair of bars 80, 81 of a longitudinal member 8, and the front and the rear ends have elastic attaching members inserted therein, the longitudinal member is connected to the vehicle body with a groove 84 formed around the longitudinal members.

The longitudinal member 8 is provided to support the suspension system firmly when a longitudinal force is applied.

The connecting arm 2 and the link carrier 7 are made of steel materials through a press treatment and the elastic bushes, pin joints and ball joints reciprocally connecting the above-mentioned arms are made of the same materials as those used in conventional suspensions, and enables the wheel 10 including the wheel carrier 1 to move up and down with respect to the vehicle body.

The elastic bushes used in the connecting parts have proper elasticity and control up and down vibrations of the control arms properly.

Referring to FIG. 4, the operating relations are illustrated hereinbelow, and the affixed marks $P_{1,2,3,4,5,6,7,8,9,10}$ stand for the connection parts.

When it comes to instantaneous centers of every component of a suspension system while wheels are vibrating up-and-down or rolling, an instantaneous center of the link carrier 7 with respect to the vehicle body is an intersecting point ($C_1$) of both extending lines connecting two pairs of connection parts of the upper and lower arms 43, 44 belonging to the lower control arm 2, that is, $P_7$ to $P_9$ and $P_8$ to $P_{10}$ respectively, and a line connecting $C_1$ and $P_5$, the lower end of the wheel carrier 1 becomes an imaginary lower control arm.

An intersecting point ($C_2$) of the lines connecting the connection parts of the wheel carrier 1 and the connection parts of the connecting link 5, that is, $P_6$ to $P_4$ and $P_5$ to $P_1$, becomes an instantaneous center of the link carrier 7 with respect to the connecting arm 5. An intersecting point of the extending line connecting $C_1$ to $C_2$ with the upper control arm 3 becomes an instantaneous center of the connecting arm 2 with respect to the vehicle body.

Accordingly, an intersecting point of a line connecting $P_1$ to $C_3$ and a line connecting $P_5$ to $C_1$ becomes an instantaneous of the wheel with respect to the vehicle body, and a line connecting $C_4$ to $P_1$ becomes an imaginary swing arm.

The length of the imaginary swing arm is so long that a rotating angle of the segment line of $P_1$, $C_3$ is very tiny with respect to the vertical displacement of the instantaneous center $C_4$.

As a result, the height variation of the instantaneous center ($C_4$) gets small relatively, and it means that the variation of the height (H) of a roll center (RC) that is an intersecting point of a line connecting the instantaneous center $C_4$ to a tread with a center line (CL) gets small.

The handling safety is improved relatively and results in enhanced running safety.

As mentioned above, the suspension systems of the preferred embodiments of the present invention can make it easy to provide the change in camber and tread that has something to do with the alignment of a steerable wheel, by applying a plurality of arms and links, to change the geometric characteristics, in accordance with the arrangement of the arms and links.

Furthermore, the present invention can freely set up the position of RC, and can freely design the arrangement of the arms and links in a given space, and as a result, can enhance a free layout degree and a large effective volume of an engine room.

What is claimed is:

1. A vehicle suspension system for a steerable wheel comprising:

a wheel carrier for rotatably supporting a wheel and including a projection portion at a rear part connected with a tie rod by a ball joint to be steered by said tie rod;

a connecting arm having a wheel side end connection part connected to an upper end of said wheel carrier;

an upper control arm having two vehicle body side connection parts diverged into a front branch and a rear branch, and connecting said connecting arm to a vehicle body;

a link carrier having a wheel side end connection part connected to a lower part of said wheel carrier;

a pair of lower control arms including upper and lower arms for connecting said link carrier to said vehicle body;

a connecting link pivotally connecting a middle point of said connecting arm and said link carrier;

a strut assembly including a shock absorber and a spring, having an upper end supported to said vehicle body by an insulator connection part and a lower end connected to said link carrier adjacent to a lower end connection part of said connecting arm; and a longitudinal member including a pair of arms, disposed longitudinally with respect to said vehicle body and connecting said link carrier to said vehicle body.

2. The suspension system according to claim 1, wherein said upper part of said connecting link is connected at a slant toward said wheel.

3. The suspension system according to claim 1, wherein each said longitudinal member arm has an attaching member inserted into a groove disposed at a middle portion of a front end of each of said longitudinal member arms to be connected to said vehicle body.

4. The suspension system according to claim 1, wherein an imaginary line connecting an intersecting point of an imaginary line connecting a pivot joint to a hinge point of said upper arm of said pair of said lower control arms with an imaginary line connecting a pivot joint and a hinge point of said lower arm of said pair of said lower control arms, to a pivot joint where said link carrier is connected to said wheel carrier becomes an imaginary lower control arm.

5. The suspension system according to claim 1, wherein an intersecting point of an imaginary line connecting two pivot joints of said wheel carrier for connecting said wheel carrier to said connecting arm and said link carrier with an imaginary line connecting two pivot joints of said connecting link to connecting said connecting link to said connecting arm and said link carrier becomes an instantaneous center of said link carrier with respect to said connecting arm.

6. The suspension system according to claim 1, where in an intersecting point of an imaginary line connecting a pivot joint and a hinge point of said upper control arm with an imaginary line connecting said intersecting point of a imaginary line connecting a pivot joint and a hinge point of said upper arm of said pair of said lower control arms with an imaginary line connecting a pivot joint and a hinge point of said lower arm of said pair of said lower control arms, to an instantaneous center of said link carrier with respect to said connecting arm becomes an instantaneous center of said connecting arm with respect to said vehicle body.

7. The suspension system according to claim 1, wherein a plurality of links are disposed so that an intersecting point of an imaginary line connecting a pivot joint of said wheel carrier for connecting said wheel carrier to said connecting arm to an instantaneous center of said connecting arm with respect to said vehicle body, with an imaginary line connecting a pivot joint of said wheel carrier for connecting said wheel carrier to said link carrier to an intersecting point of an imaginary line connecting a pivot joint and a hinge point of said upper arm of said pair of said lower control arms with an imaginary line connecting a pivot joint and a hinge point of said lower arm becomes an instantaneous center of said wheel with respect to said vehicle body.

8. The suspension system according to claim 7, wherein a roll center (RC) is positioned at an intersecting point of an imaginary line connecting said instantaneous center of said wheel with respect to said vehicle body to a wheel tread with a center line of said vehicle body.

* * * * *